United States Patent [19]

More

[11] Patent Number: 4,863,535
[45] Date of Patent: Sep. 5, 1989

[54] ELECTRICAL ENVIRONMENTAL SEALANT AND METHOD

[75] Inventor: James R. More, Woodbury, Minn.

[73] Assignee: Minnesota Mining and Manufacturing Company, St. Paul, Minn.

[21] Appl. No.: 130,541

[22] Filed: Dec. 9, 1987

[51] Int. Cl.[4] ............................................. H01B 13/10
[52] U.S. Cl. ....................................... 156/49; 156/54; 156/55; 174/76; 174/84 R; 428/68
[58] Field of Search ........................ 156/49, 52, 53, 54, 156/55; 174/76, 84 R; 428/68

[56] References Cited

U.S. PATENT DOCUMENTS

| | | |
|---|---|---|
| 3,183,302 | 5/1965 | Wochner et al. |
| 3,519,731 | 7/1970 | Grunbaum |
| 4,157,208 | 6/1979 | Roberts et al. |
| 4,392,014 | 7/1983 | Trumble et al. |
| 4,451,696 | 5/1984 | Beinhaur |
| 4,504,699 | 3/1985 | Dones et al. |
| 4,600,969 | 7/1986 | Hendrickson |
| 4,610,738 | 9/1986 | Jervis |
| 4,645,285 | 2/1987 | Cozzens et al. |
| 4,647,717 | 3/1987 | Uken |
| 4,662,692 | 5/1987 | Uken et al. |
| 4,714,801 | 12/1987 | Koblitz et al. |
| 4,718,678 | 1/1988 | Vansant |
| 4,721,832 | 1/1988 | Toy ..................... 156/49 X |
| 4,736,071 | 4/1988 | Hawkins et al. |
| 4,741,940 | 5/1988 | Reed ..................... 428/68 |

FOREIGN PATENT DOCUMENTS 1374201 8/1964 France .

OTHER PUBLICATIONS

Photograph of a Tape-Wrapped Wire Junction.
Photograph of a Junction Sealed with Vinyl Strips.
Photograph of a Junction Sealed with Vinyl Mold Arrangement.
Photograph of a Junction at a Terminal Sealed with Vinyl.
Photograph of a Junction Sealed with Heat-Shrink Tubing.
Waterproof Wire Connector; Gel-Tite(TM); GardenAmerica Corporation.
Scotchbrand Electrical Moisture Sealant Pad 09092; 3M Publication.

Primary Examiner—Robert A. Dawson
Attorney, Agent, or Firm—Merchant, Gould, Smith, Edell, Welter & Schmidt

[57] ABSTRACT

A method and arrangement are provided to generate an environmental seal around a connection such as an electrical junction. The arrangement comprises a pad arrangement having a substrate and a sealant pad associated therewith. The sealant pad comprises a highly viscous sealant which, under pressure, can be forced into areas between adjacent wires, to provide effective moisture seals. According to preferred methods of the present invention a substrate having sealant thereon is folded around a junction to be sealed, such that the substrate retains the sealant against the electrical junction. In a step of the preferred method, pressure is applied to the enclosed sealant pad, generating hydraulic forces contained in such a manner as to the direct sealant between adjacent wires, spreading same apart. In preferred applications, preferred direction of sealant is facilitated by a preferred pressure die arrangement.

30 Claims, 4 Drawing Sheets

ELECTRICAL ENVIRONMENTAL SEALANT AND METHOD

FIELD OF THE INVENTION

The present invention concerns environmental seals for connections, in particular moisture seals for electrical connections such as are found in automobiles or the like. The invention particularly concerns a method and arrangement for providing a moisture-tight seal around exposed electrical wire splices and junctions. The arrangement and method are particularly advantageous, when applied to wire junctions involving at least two adjacent wires.

BACKGROUND OF THE INVENTION

Junctions involving electrical wiring generally should be sealed or protected against exposure to the elements, particularly moisture: for inhibition of deterioration from corrosion; to reduce the likelihood of electrical shorts or the like; and, to otherwise enhance performance of the electrical system of concern. Generally, such junctions involve at least two, and often a large number, of insulated wires brought together, and exposed, at a particular junction. The junctions may be of a variety of types, including: connections having wires brought together from opposite directions, or a plurality of directions; pig-tail connections wherein the wires are generally directed toward the site of connection from a single direction; and, end or terminal connections, whereat a metal ring or the like, for attachment to a terminal, is mounted upon an end of a wire or plurality of wires. Generally maintenance of secure, conductive, connection at the point or points of engagement is facilitated through mechanical means such as by clamping and/or with use of welds or points of soldering.

As previously indicated, generally the connection involves exposure of conductive wire portions, from a plurality of extensions of insulated wire. The exposed portions, after the connection is made, should be protected from the environment, especially from moisture. Numerous seals and seal methods have been developed; however, none have been completely satisfactory for reasons discussed below. The conventional methods include the following:

An early, convenient and still frequently used method of providing a protective seal around a wire junction is through a wrapping of an insulating, typically treated-cotton, fabric, with an adhesive thereon, around the connection or junction. This method is inexpensive and easy to apply. However, it is not very effective in providing for a good moisture seal, as water can leak up along ends of the spirally-wrapped bundle. This is a particular problem if the connection involves at least two wires being brought together in a manner not co-axial, but rather generally parallel to, or adjacent, one another. For example, if two wires are brought to the connection from one direction and three wires are brought to the connection from an opposite direction, simply wrapping tape around the outside of the entire connection does not provide any moisture seal in the areas between adjacent insulated wires. For this reason insulating tape is, generally, considered an unacceptable manner of providing a good moisture seal on an electrical junction or the like.

A relatively recently developed alternative, to the use of tape, is the molding of a plug of vinyl or the like around the junction. To accomplish this, the junction, often involving multiple strands of wiring, is placed in a mold arrangement, and a vinyl plastic material or the like is injected into the mold and hardened therein to form a protective casing around the connection. This arrangement has not been completely acceptable for numerous reasons. First, injection molding has not been completely satisfactory in providing for seals when multiple wire arrangements are provided. That is, moisture leaking into spaces or areas between adjacent wires has still been a substantial problem. Secondly, when such vinyl molded arrangements are utilized under relatively high temperature conditions, such as are often found in automobile engine environments or the like, eventually deterioration of many conventional molded vinyl polymer materials occurs, in some instances resulting in a failure of the vinyl material, and loss of seal. This can occur, for example, should plasticizers be eventually leached from the seal.

Vinyl molded arrangements have been a particular problem when a wire or plurality of wires are brought into contact with, and attached to, a large metal connection, such as a mounting adaptor, ring terminal connector, or the like. In use, such metal connectors often expand and contract substantially, under wide temperature fluctuations. Molded vinyl seals, around such junctions, will tend to fracture in time, and fail, as the plasticizers are leached out and the metal continues to expand and contract, placing stress on the seal. Further, it is frequently difficult to obtain good vinyl insulator coverage of wire filaments at the point of connection to a terminal connector, or the like, when injection molding is relied on as the method of obtaining insulator placement. Also, vinyl molded arrangements do not generally bond and/or adhere well to typical wire insulators.

Yet another arrangement for providing an insulator around an electrical connection concerns the utilization of a heat shrinkable sleeve, tube or the like. For this method, an extension of heat shrink tubing is generally oriented over an otherwise exposed connection. The extension of tubing is then heat treated to shrink and seal around the connection. In some instances a hot-melt adhesive is used in association with heat shrink tubing; the hot-melt adhesive being oriented between the tubing and the wires, so that upon heating and shrinkage of the tubing the adhesive adheres the tubing to the wires.

Heat shrink tubing as been fairly effective in providing good moisture seals with small, simple, junctions; i.e. junctions or connections involving only a few wires, especially two co-axial wires. However, when three or more wires extend into the junction in a manner substantially parallel to one another, substantial problems with moisture leakage between adjacent wires still pervade. That is, heat shrink tubing, even when utilized in association with a hot-melt adhesive, does not provide good sealing between adjacent wires, particularly multiple, adjacent, substantially parallel, wires being brought into the junction.

Another problem with heat shrink tubing has been that it has not, in the past, been particularly effective over a very wide temperature range. Generally, for uses such as in the automotive industry, it is considered desirable that the seals exhibit effective performance over a temperature range of about −40° C. to 130° C. Over such a broad range, typical heat shrink tubing will sometimes fail, particularly at the lower temperatures.

That is, the materials become inflexible and the seals are readily broken.

Another problem with heat shrink arrangements is that it is difficult to arrange such tubing to seal well when the connection involves a relatively large diameter bundle of wires on one side, and a relatively small diameter bundle of wires on the other side. That is, as the heat shrink material is shrunk, unless it is able to shrink a substantially constant amount over its entire length, which is often not possible when a large diameter and small diameter bundle of wires are located on opposite sides of the junction, maintenance of good seal is a problem. For example, typically heat shrink tubing will tend to slide toward the smaller diameter bundle or side, as it is shrunk. Thus, heat shrink seals do not work very effectively if, for example, one or two wires are brought into a connection from one direction but substantially more, such as three-to-five wires, are brought into the connection from an opposite direction. Further, heat shrink arrangements are not well-adapted for use on pig-tail splices or electrical connections involving mounting terminals.

In addition, it can be difficult to arrange heat shrink tubing over the connection of interest, especially since, generally, heat shrink tubing does not have a seam therein, and therefore must be slipped over the wires and then slid down the wires to cover the connection or junction of concern. Further, application of appropriate heat to cause shrinking may be energy intensive, inefficient and inconvenient.

A recently developed method and arrangement for providing seals around electrical connections involves the use of a plurality of vinyl strips sealed or molded together by ultrasonic welding techniques. Generally, for the conventional application of such a method, a vinyl strip is placed along each of opposite sides of an electrical junction. The two strips are then molded to one another, in a manner sandwiching the junction therebetween, by means of ultrasonic welding or similar techniques.

Especially when multiple wire arrangements are utilized, such methods are not completely satisfactory for numerous reasons. First, as with all of the methods previously described, the method provides no effective seal to leakage of moisture between adjacent, substantially parallel, wires of multiple wire arrangements or bundles. Secondly, such arrangements inherently involve seams, along opposite sides where the vinyl strips are brought together. The seams may, in time, fail, especially under relatively high stress use conditions. Such arrangements have also been observed to be temperature sensitive, and thus are relatively likely to fail under high temperature or low temperature stress conditions. Finally, such vinyl strips do not generally provide any significant sealing interaction with the insulation material of most wires. That is, vinyl strips capable of being welded by ultrasonic methods generally do not form good seals with insulation materials typically utilized for wire insulation, for example the vinyl plastics such polyvinyl chloride plastics, cross-linked polyethylene materials, or the like.

What has been needed has been a method and arrangement for providing an effective moisture seal on or around an electrical junction, or the like. What has been particularly needed has been a method and arrangement particularly suited for providing a good effective positive seal for situations in which multiple wires, generally parallel or adjacent to one another, are brought into an electrical connection site or junction. Specifically, a method which has been especially needed is one which provides for an effective seal against moisture moving into the area of the junction by migration between adjacent insulated wires.

SUMMARY OF THE INVENTION

A moisture sealant pad arrangement is provided for insulating and sealing both simple and relatively complex wiring harness junctions. Also, according to the invention, a method is provided to effect an electrical moisture seal, through utilization of the sealant pad arrangement.

Although sealant pad arrangements according to the present invention may be utilized in association with a variety of types of electrical junctions; generally methods according to the present invention are particularly adapted for providing a sealant enclosure for junctions having at least two wires extending thereto in a manner generally adjacent one another. The term "adjacent" as used herein is not meant to be limited to wires which abut one another, but rather also includes within its meaning wires extending next to, but spaced from, one another. Junctions to be sealed according to the present invention may also include a wire (or wires) extending thereto from a direction generally opposite to the above described two "adjacent" wires.

According to the method, an electrical connection is engulfed, encased, or immersed within a sandwich-type arrangement of relatively viscous sealant. The sandwich-type arrangement generally comprises a pad of viscous sealant, adhered or laminated to a flexible substrate, which has been wrapped around the junction. The wrapped junction, having wires extending outwardly therefrom, is then pressure treated. Under sufficient pressure, hydraulic forces cause the viscous sealant to flow between adjacent wires of the connection, spacing same apart. As a result, the sealant is forced into spaces between adjacent wires, providing an effective moisture seal thereat.

Preferred applications of the above-process or method generally involve utilization of: an appropriate pad arrangement of viscous sealant and flexible substrate; and, an appropriate mechanism for the application of appropriate pressure to effect the seal.

In general, the pad arrangement comprises substrate having viscous sealant thereon. The substrate facilitates handling of the viscous sealant, and protects against development of a sticky outer surface on the overall seal. A preferred substrate is an all-weather, flexible, non-tacky, vinyl plastic sheet material or the like. Such materials are well-known, and are available in a variety of thicknesses. Typically flexible all-weather grade vinyl or polyvinyl chloride (PVC) having a thickness of about 0.004–0.008 inch (about (0.01–0.02 cm) may be utilized in arrangements of the present invention, although other materials and other thicknesses may be utilized.

A wide variety of sealant materials may be utilized to engulf the electrical connection, in arrangements and methods according to the present invention. Generally what it required of such sealants it that they: be sufficiently viscous to retain a pre-formed shape and to be moldable, a viscosity of about 2000 poise at a shear rate of 1/600 sec. at 75° C. being more than sufficient for most applications; exhibit sufficient adhesion to substrate and wire insulations to provide a good seal (typically 12.5 lbs/in width or 22N/10 mm is more than sufficient); exhibit a sufficiently high insulation resistance, for example about $1 \times 10^6$ megohms is obtainable and more than sufficient; exhibit sufficiently low water absorption, for example on the order of 0.75% is obtainable and effective; and, exhibit good adherence to metals from which wire connections may be made, for example an adherence of about the same as the above-related adherence to substrate and insulator. Adhesives or sealants usable include thick, rubber-based, compounds. Preferred sealants generally comprise soft, tackified, elastomeric compounds extended with oils and fillers. Typical, useable, elastomeric bases for such compositions include polyisobutylene/EPDM rubber/-butyl rubber mixtures. Such sealants do not readily degrade when exposed to automotive and marine environments. Further, they are not substantially adversely affected by severe vibration or extreme temperature change.

The electrical connection can be sealed between or sandwiched within the sealant material in a variety of manners. For example, two separate pieces of substrate having sealant thereon could be brought into contact with one another, with the electrical connection sandwiched therebetween. In preferred applications, however, a single pad of sealant on a single piece of substrate is provided. The electrical connection is then placed on the pad of sealant, and the substrate and sealant are folded around the electrical connection, to substantially completely encase same and form a sealant/junction combination.

In preferred embodiments, the sizes of, overlapping relationship between, and relative sizes of, the sealant pad and the substrate are significant and preferred arrangements provide advantages. Preferred pads should have sufficient size and depth to completely overlap and engulf an electrical connection to be sealed. Preferably the substrate includes at least two, opposite, flap sections, which overlap the sealant pad in a manner to facilitate formation of a covering over an elongate seam formed during the process. That is, the substrate is preferably somewhat larger than the sealant pad. Then, preferably, when the substrate and sealant pad are folded over the electrical connection, the flap extensions of substrate mate at or near one another along and over an otherwise exposed elongate sealant seam. The substrate flaps, in this region, act to cover the sealant and inhibit exposure of the sticky sealant material to the environment.

After having been engulfed in sealant as above described, the arrangement is pressure-treated to effect preferred sealing. The step of sealing under pressure generates hydraulic forces in the viscous sealant which spread out adjacent wires and permit the forcing of sealant into spaces between the wires. As a result, an effective environmental seal is obtained.

Generally, the step of application of pressure involves the placement of the sealant/junction combination between a pair of die plates, which plates are brought together under substantial pressure. Preferred sealing is effected through utilization of die plates having preferred profiles. In die plate profiles act as flow directing means to direct flow of compressed sealant in a preferred manner. In particular, each die plate is preferably provided with a concave recess therein, defining a pair of opposite side walls and opposite end surfaces. Preferably the sealant/electrical junction combination is oriented to longitudinally extend between, and substantially parallel to, the opposite side walls of the die plates. That is, the sealant/junction combination is oriented with wires extending outwardly therefrom generally parallel to the recess side walls, and over the end surfaces. As the die plates are brought together under pressure, the die plate curved surface acts to force the sealant to spread in directions generally normal to longitudinal axes of wires associated with the junction, i.e. toward the sides rather than the ends of the sealant/junction combination. The flat end surfaces on the die plates, at opposite ends of the recess, facilitate compression of the arrangement and further force the sealant to cause spreading of the wires. Thus, the particular preferred die profile facilitates spreading of the wires apart, and movement of sealant therebetween, with generally minimal leakage of sealant outwardly from ends of the arrangement.

In one particular improved, preferred, method and arrangement, a generally rectangular pad of sealant is positioned on a generally rectangular piece of substrate. Preferably, the pad is oriented on the substrate such that a small border of substrate extends around, and beyond, three of the four sides of the rectangular pad of sealant. When this arrangement is utilized, the electrical connector is preferably rolled up within the sealant pad, and flaps of substrate, i.e. vinyl sheet, are left along opposite ends of the rolled seal, and also along an outer edge or seam of the rolled seal. When such an arrangement is placed under pressure between die plates, a preferred seal is formed in a manner which makes effective use of sealant material and generally is free from substantial leakage of sealant material outwardly from underneath the protective substrate.

The drawings constitute a part of this specification and include exemplary embodiments of the invention, while illustrating various objects and features thereof. It will be understood that in some instances relative material thicknesses, and relative component sizes, may be shown exaggerated, to facilitate an understanding of the invention.

DETAIL DESCRIPTIONS OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but rather as a basis for the claims and as a representative basis for teaching one skilled in the art to variously employ the present invention in virtually any appropriately detailed system or manner.

The Embodiment of FIGS. 1 through 5

Figure 1:
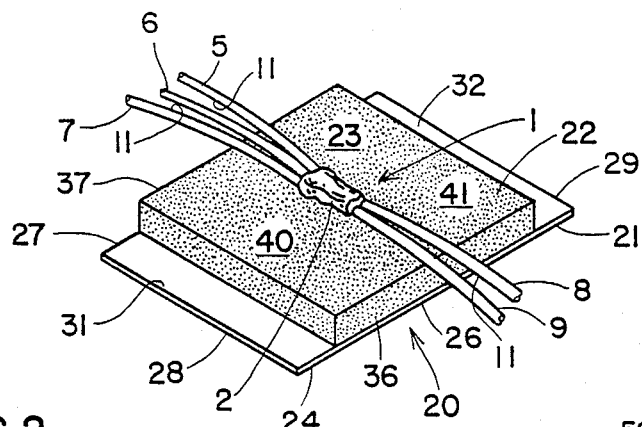
FIG. 1 is a fragmentary perspective view of an electrical junction shown placed on a sealant pad arrangement according to a step of a method of the present invention.
Figure 2:
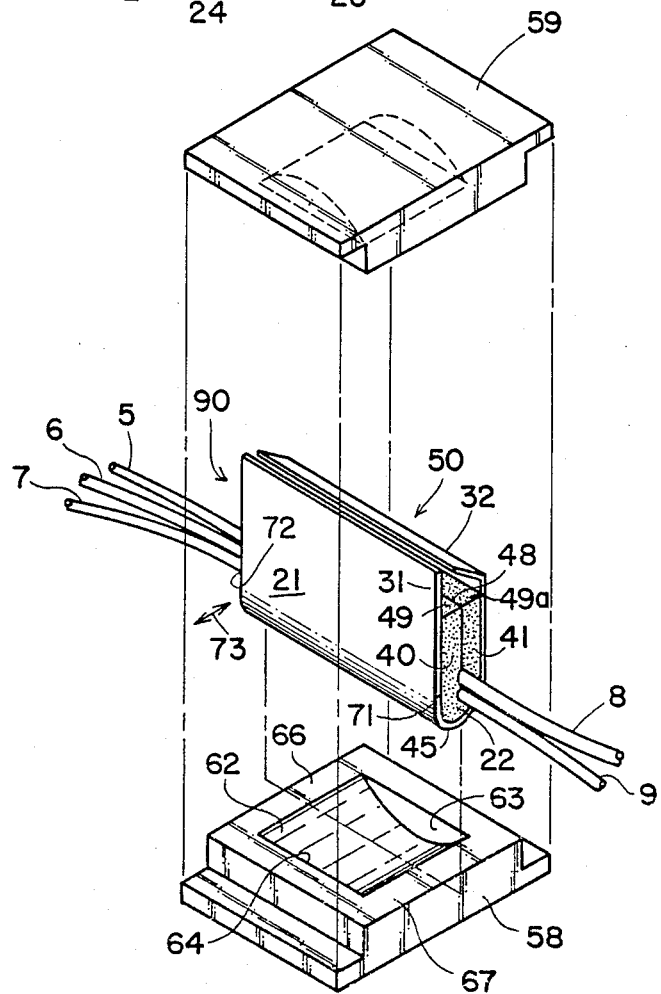
FIG. 2 is a fragmentary, schematic, perspective view showing a sealant pad arrangement and an electrical junction arrangement after a step of folding the sealant pad arrangement over the electrical junction, and also showing a preferred orientation of the resulting sealant/electrical junction arrangement or sandwich in association with a pair of die plates, for a step of compression.
Figure 3:
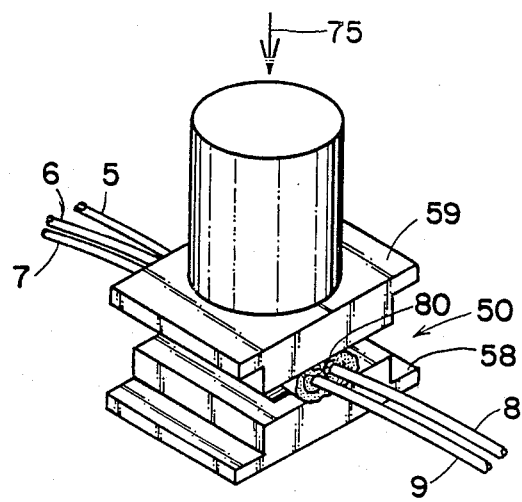
FIG. 3 is a fragmentary, schematic, perspective view illustrating a step of pressure-treating a sealant/electrical junction arrangement according to the present invention.
Figure 4:
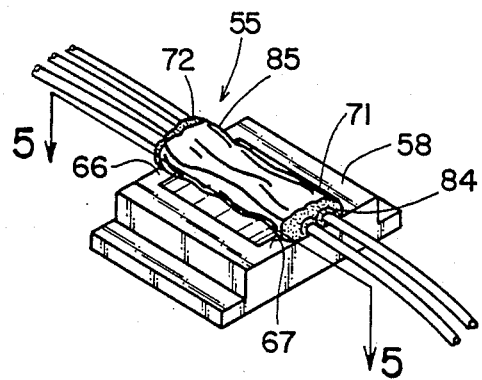
FIG. 4 is a fragmentary, schematic, perspective view generally illustrating a sealant/electrical junction arrangement following the step of FIG. 3.
Figure 5:
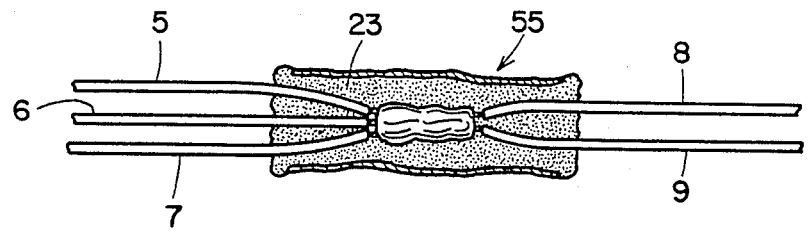
FIG. 5 is an enlarged fragmentary top cross-sectional view of a sealant/electrical junction system made according to the method illustrated in FIGS. 1 through 4; the cross-section being such as to show an electrical junction incased within sealant, and being taken generally along line 5—5, FIG. 4.

In FIGS. 1 through 5, sequential steps in producing an environmentally sealed electrical junction, according to the present invention are illustrated. In general: FIGS. 1 through 3 illustrate steps of formation; FIG. 4 shows a completed environmentally-sealed connector or junction; and, FIG. 5 shows a cross-sectional view of FIG. 4, to illustrate internal features.

Referring to FIG. 1, reference numeral 1 indicates an electrical connection which is to be environmentally protected and sealed, according to the present invention. Electrical connection 1 may be a standard conventional electrical junction 2, as, for example, is found in automobiles, trucks, boats, tractors or the like. It is to be understood that electrical connection 1 is intended to be representational only of variety of types of electrical connections which may be sealed by the methods of the present invention, and through utilization of pad arrangements according to the present invention. The particular electrical connection 1 depicted comprises a junction 2 at which five wires 5, 6, 7, 8 and 9 are brought together. Generally, each of wires 5, 6, 7, 8 and 9 is an insulated wire, having a water-tight insulation, such s a polyvinyl chloride (PVC) or crosslinked polyethylene sheath, thereover. Also, a variety of gauges of wire, including 8-24 guage, may be easily handled by arrangements according to the invention. In the region of junction 2, each of the wires is exposed, for formation of a conductive connection. Typically, the wires are connected to one anther, or to the connection, by mechanical means, typically by crimp sleeves, welding, soldering, or some combination of such techniques or devices.

It will be understood that various numbers of wires may be brought into a junction such as junction 2, the example of FIG. 1 merely being representative. A problem addressed by the present invention is the encapsulation of such a junction 2 within an environmental seal, particularly a substantially moisture-proof seal, to protect the junction 2 from corrosion, moisture interference etc. The arrangement shown in FIG. 1 involves a plurality of wires (5 wires); and, it is a particular advantage of the present invention that such multi-wire arrangements can be accommodated. That is, arrangements utilizing only two oppositely directed wires are generally easier to seal by conventional means, than arrangements involving in a multiplicity of wires, especially arrangements involving at least two adjacent wires. A reason for this is that between each pair of adjacent wires, for example wires 5 and 6, brought into junction 2 from approximately the same direction, there is a high risk area 11, for leakage. When conventional methods of protection, described in the background of the invention above, are utilized for junctions 2, generally the areas 11 between wires are not appropriately sealed. As a result, moisture can creep into the areas 11 and toward the junction 2. The method of the present invention is to apply a seal such that the areas 11 are efficiently and effectively sealed.

In FIG. 1, reference 20 generally designates a unique arrangement which, according to the present invention, is utilized to provide a preferred, effective, moisture or environmental seal around a junction such as junction 2. Arrangement 20 generally comprises substrate 21 having a pad 22 of sealant 23 thereon. Generally, substrate 21 is a sheet 24 of relatively strong flexible material suitable to provide an overall outer covering or jacket for the completed seal. Preferred materials include sheets of all-weather, flexible, non-tacky, vinyl material. A variety of thicknesses of material may be utilized, however generally vinyl sheets having a thickness of about 4–8 mils (0.004–0.008 inches or about 0.01–0.02 cm) are preferred.

The size of sheet 24 depends, of course, upon the size of the junction 2 to be covered and protected. Generally, for most seals, a pad about 4.0–5.0 cm by 3.0–4.0 cm will be sufficiently large, as many typical automotive or marine electrical junctions 2 are about 1.0–2.0 cm long and about 0.25–0.75 cm wide.

For the embodiment of FIG. 1, substrate 21 comprises a single piece or sheet 24 of substrate material. This will be preferred, for ease of handling and use. However, it is foreseen that in some applications of the present invention multi-piece substrate arrangements, each piece having sealant material thereon, might be utilized and be brought together, for example, in a sandwich-like form.

Still referring to FIG. 1, for the preferred embodiment piece 24 of substrate 21 is generally a right quadrangle and preferably is rectangular with opposite longer side edges 26 and 27, and opposite shorter end edges 28 and 29.

Sealant pad 22 comprises an exposed bed or pad of thick, viscous, moisture-resistant, sealant material: which can be readily molded around junction 2 in a manner adhering thereto; and which, under pressure, exhibits various fluid properties. It will be understood that a variety of such materials may be utilized in pad arrangements 20 according to the present invention.

Generally what is required is a sealant of sufficiently high viscosity to be readily handable and to retain a formed shape, for example the rectangular shape shown in FIG. 1, under normal ambient and use conditions. However, under substantial pressure, the sealant material should flow, as described below, sufficiently to be incorporated into the areas 11 between adjacent wires. Further, the material of sealant pad 22 should be sufficiently moldable under ambient conditions to facilitate the methods of the present invention.

A variety of appropriate materials usable as sealant 23 for beds or pads 22 according to the present invention, are already known; however it is considered within the scope of the present invention to include sealants yet to be developed.

Preferred sealants generally comprise soft, tackified, elastomeric compounds extended with oils and fillers. Typical, useable, elastomeric bases for such compositions include polyisobutylene/EPDM rubber/butyl rubber mixtures. Preferred mixtures have a viscosity of at least about 2000 poise at a shear rate of 1/600 sec. and a temperature of 75° C.

One useable sealant composition comprises a mixture of the following materials, blended to a viscosity of 2650 to 3350 poise, at a shear rate of 1/600 sec. and a temperature of 75° C.

| Material | Amount, PHR* |
|---|---|
| Polyisobutylene | 40.0 |
| EPDM rubber | 28.8 |
| Butyl rubber | 31.2 |
| Polybutene | 100.0 |
| Inorganic filler | 150.0 |
| Asphalt | 30.0 |
| Carbon black | 15.0 |
| Hydrocarbon tackifier | 50.0 |

*PHR = Parts per Hundred Rubber component. The term "Rubber Component" is meant to refer to the total of the polyisobutylene, EPDM rubber and butyl rubber components.

Preferred thicknesses of pad 22 will depend upon: the dimensions of the junction 2 to be sealed; and, the number and size of the wires extending into the junction. Generally thicknesses of about 50-140 mils (0.05-0.140 inches or about 0.125-0.36 mm) will be sufficient for most common junction sizes. Preferred sealant pads 22 have a substantially constant cross-sectional area and shape, for ease of preparation and use.

For the embodiment depicted in FIGS. 1 through 5, the sealant pad 22 is oriented on the substrate 21 such that opposite overlap flaps 31 and 32 of substrate 21 extend beyond sealant pad 22, in the area of edges 28 and 29. For most embodiments each flap 31 and 32 should be about $\frac{1}{8}$-$\frac{3}{8}$ inches (0.3-1.0 cm), and preferably about $\frac{1}{4}$ inch (0.6 cm), in length. Preferably each is considerably wider than the sealant pad 22 is thick. Advantages obtained from extensions 31 and 32 will be apparent from further descriptions relating to the process of the present invention.

It will also be observed, upon examination of FIG. 1, that for the preferred embodiment of pad arrangement 20 depicted, opposite edges 36 and 37 of pad arrangement 20 are substantially flush with, or adjacent to, opposite edges 26 and 27 respectively, of substrate 21.

Still referring to FIG. 1, pad arrangement 20 defines a first sealant pad portion, half, or side 40 and a second sealant pad portion, half, or side 41 which, during use, are brought against one another in a manner, FIG. 2, appropriate to engulf, encase or enclose junction 2 therebetween. This will be understood by reference to FIG. 2, wherein it is illustrated that during a step of a method or process according to the present invention, pad 22 is folded over connector 1, to enclose the junction 2, now out-of-view, therein. By reference to FIG. 2, it will be understood that advantage results from substrate 21 having a single piece construction, rather than a two-piece construction. Specifically, a portion 45 of the substrate 21 acts as a hinge or fold line enclosing a side of the folded arrangement. If a two-piece substrate were utilized, each piece having a portion of sealant thereon, a sandwich-like arrangement could be provided; however, no such convenient, enclosing, hinge-line 45 would be present.

Referring to FIG. 2, it will be understood that the folding of pad arrangement 20 is preferably such that the flaps 31 and 32 are brought toward one another, along a knit line or seam 48, whereat edges 49 and 49a of sealant pad 22 are mated or brought together. Flaps 31 and 32 will generally, during the method of sealing junction 2 using pad arrangement 20, obtain a covering relationship with respect to seam 48 and edges 49 and 49a, protecting same and preventing any substantial, elongate, sticky, exposed area of sealant 22 along seam 48.

The arrangement which results from engulfing junction 2 in arrangement 20, with substrate 21 wrapped along and around an outside thereof is indicated by reference 50, FIG. 2, and is referred to herein by the terms "sandwich," "pre-pressure arrangement," "substrate-wrapped sealant/electrical junction combination," or variants thereof.

Generally, especially if multi-wire arrangements are utilized, areas between adjacent, substantially parallel wires, for example between: wires 5 and 6; wires and 7; and, wires 8 and 9, are not sufficiently filled with sealant 22 to provide effective moisture seals, after engulfing the junction 2 within the arrangement 50 by merely folding the pad arrangement 20 over the junction 2.

According to the present invention, and as illustrated by FIGS. 2 and 3, pressure is applied to arrangement 50 in a manner facilitating formation of a final sealed sealant/electrical junction arrangement 55, FIG. 4. Referring to FIG. 2, arrangement 50 is shown oriented between opposite die plates 58 and 59 which, when brought together under sufficient force, will apply compressive forces in a preferred direction to arrangement 50. Preferably arrangement 50 is oriented with respect to the die plates 58 and 59 as shown, with hinge line 45 directed toward one die plate (58), and open seal area or knit area 48 directed toward an opposite die plate (59). As a result of compression between the die plates 58 and 59, sealant 22 is pressed into areas or spaces between the wires 5, 6, 7, 8, and 9; the hydraulic forces tending to spread the wires apart and provide for flow of sealant therebetween. Preferred die plate constructions, as described below, facilitate this.

Referring to FIG. 2, generally the die plates 58 and 59, for preferred embodiments of the present invention, are identical to one another, and are mounted as mirror images. Preferred die plate constructions will be understood by reference to die plate 58. Die plate 58 includes therein a recess 62 having opposite side walls or ridges 63 and 64. Recess area 62, for the preferred embodiment, is a generally concave depression having a substantially circular radius. A variety of sizes and shapes of recess areas 62, including variations in depth and curvature, may be utilized in arrangements according to the present invention. For typical applications involving an exposed junction having an overall length of about 1-2 cm., die recesses may preferably be formed with: a length between side walls 63 and 64 of about 2.0-3.5 cm; and, a width of recess, i.e. the distance between end surfaces 66 and 67, FIG. 2, of about 1.75-2.75 cm. Generally, the overall depth, at maximum, of such recess is about 2.0-4.0 mm. From further descriptions herein, the importance of end surfaces 66 and 67 to the sealing process will be understood. Preferably each surface 66 and 67 has an overall width of 0.5-1.0 cm. The recess 62 and end surfaces 66 and 67 generally define a flow directing means which directs sealant flow in a preferred manner.

Again, the size and shape of the recess may be varied considerably, in accordance with the principles of the present invention. However, generally what is required is that the recess 62 be sized and shaped such that when the arrangement 50 is placed thereover, oriented as shown in FIG. 2 with the wires 5, 6, 7, 8 and 9 extending: generally across and between the opposite side walls 63 and 64; and, between surfaces 66 and 67, the arrangement 50 is slightly longer than the gap between end surfaces 66 and 67, preferably overlapping same by about ⅛ to ⅜ inches (0.3-1.0 cm) on both ends.

According to the present invention die plates 58 and 59 are oriented in a press, or the like, to be brought together in an overlapping fashion; that is each with its recess 62 overlapping, or aligned with, the recess in the opposed die. If the arrangement 50 is positioned between the die plates 58 and 59 as illustrated in FIG. 2, as the die plates 58 and 59 are brought toward one another, some of the relatively soft highly viscous sealant material 23 will tend to be deformed outwardly against substrate 21 in such a manner that the recesses 62 became somewhat filled and occupied with fluidic, compressible, material trapped within the substrate 21. Under continued compression force, the curvature of the recesses 62, and the opposite end surfaces 66 and 67 of arrangement 50, will tend to contain sealant 23 flow in a preferred manner. The net result is a flow of sealant 23 outwardly against substrate 21, generally in the direction of line 73, FIG. 2. The substantial hydraulic forces built up within substrate 21, under the compression conditions, tend to spread the wires 5, 6, 7, 8 and 9, while forcing the sealant material 23 into the areas 11. Further, during compression either or both flaps 31 and 32 will tend to folded over open edge 48, to cover same. Also, portions 49 and 49a will tend to be knit with one another, eliminating a distinguishable seam 48. The net result, if appropriate pressure is applied, is a substantial engulfing of connection 1, and junction 2, within sealant 23 in such a manner that sealant 23 sets around each individual wire, for example wires 5, 6, 7, 8 and 9, providing a good moisture seal. Again, it is noted that the preferred die shape and orientation shown, facilitates the sealing.

Referring to FIG. 3, die plates 58 and 59 are shown having been brought together under pressure oriented in the general direction of arrow 75, to compress arrangement 50 therebetween and to form a final sealant-/junction arrangement 55. Generally, the arrangement 55 is depicted illustrating that some of the sealant material has flowed into and outwardly from area 80 between the wires, for example wires 8 and 9, individually sealing each wire.

Typically about 200 to 900 lbs/in$^2$ of force is sufficient to provide appropriate hydraulic forces for sealants 23, when the sealants are as above described and the substrates are as above described. Significantly less than about 200 lbs/in$^2$ and very likely insufficient pressure is applied to cause appropriate deformation of substrate 21, and flow of sealant 22, for good wire spreading in many applications. Much over than about 900 lbs/in$^2$ of pressure tends to damage many conventional wires or insulations.

Release of the arrangement 55 from the die plates 58 and 59, may be facilitated through provision, on each die plate 58 and 59, of a non-stick coating or the like. A variety of such coatings are known and available, including Plasma 934 (a nickel-chrome tungsten carbide type coating; On-Site Coating, Inc., Memphis, Tenn.).

Referring to FIG. 4, the final sealant/junction arrangement 55 is depicted, resting upon one of die plates 58. Again, it will be observed that there are small portions of overlap 84 and 85, at opposite ends of recess 62, in the areas of surfaces 66 and 67.

Referring to FIG. 5, arrangement 55 is depicted so it can be understood that some of sealant 23 has been forced into areas between adjacent pairs of wires 5, 6, 7, 8 and 9, to provide an effective overall environmental seal. The outer covering or substrate 21 protects and contains the sealant 23, and also prevents large areas of sticky mastic or sealant material from being exposed to an environment. Otherwise, handling problems would occur.

Substantial advantages are offered by sealant/junction arrangements made according to the above described process, and utilizing the above described materials and/or arrangements. First, the seal and method are appropriate for both simple and complex wiring harness junctions. While on simple junctions the problem of moving sealant into areas between adjacent wires is less pronounced, it may still be desirable to utilize the above described process with such systems, to provide advantageous sealant material 22 around the associated junction. Further, even after application to the junction 2 as shown in FIG. 4, pad arrangement 20 is still sufficiently flexible so that it can be somewhat molded or reshaped to suit particular needs or environments without any substantial likelihood of damage to the seal or the wires. The seal arrangement 20 can be readily removed, if necessary, to provide access to the wire junction 2; for example by cutting the seal open with a knife or the like.

As a result of the described method of production of the sealant/junction arrangement, achievement of good seals with a high degree of reproducibility and consistency is possible, since the relatively high pressures involved ensure: good fluid flow; reproducible spreading of the wires apart; and, good sealing. This consistency can be further facilitated, by appropriate selection of die size and shape. Utilizing a flexible vinyl jacket as the substrate facilitates construction, as it can be readily molded and shaped. Further, vinyl jackets are sufficiently strong to resist breakage under pressure from flowing sealant, during the pressure application phase of the process described.

Generally it is important, FIG. 2, that the arrangement 50 be oriented such that elongate edge portion 48, between portions of sealant 40 and 41, be directed toward as least one of the die plates 58 and 59. Any alternate orientation, and the sealant 23 might tend to be squeezed outwardly from the entire arrangement 20, as the plates 58 and 59 are pressed together. That is, the fluid sealant 23, is partially retained within the arrangement 20 by the substrate 21, to a great extent, when oriented as shown in FIG. 2. Further, recess side walls 63 and 64 facilitate containment of the highly viscous sealant 23.

Generally, with sealants as above described, and pressure as above described, the operations can be readily conducted at ambient temperatures. Thus problems with temperature control, and highly inefficient heat treatment processes are generally avoided. As a result, the method is well-suited for incorporation in high volume or mass manufacturing systems. Handling of sealant pads 22 before application to a junction 2, FIG. 1, may be facilitated through use of a protective release liner, not shown. Such a liner could be removed from an exposed surface of sealant pad 22 just before use.

The Embodiment of FIGS. 6 through 10

Referring to FIG. 2, the previously described embodiment, while relatively simple to effect, does involve a small portion relatively inefficiently used sealant 23. In particular, in region 90 much ;:ore sealant 23 is oriented than is necessary to effect a good seal; i.e. there is over-kill of sealant 23. While such excess sealant could be minimized through the utilization of a narrower pad 22 of sealant 23, generally to effect good folding and sealing with the process described, excess sealant 22 will be preferred. Further, and referring to FIGS. 3 and 4, as pressure is applied to arrangement 50, to form arrangement 55, some sealant 23 tends to be squeezed outwardly along opposite end edges 71 and 72. This can create sticky portions in arrangement 55, inhibiting handling somewhat. The method of FIGS. 1–5 will, sometimes, be preferred in spite of the described processes since the folding or molding step is relatively simple and easy to effect.

Figure 6:
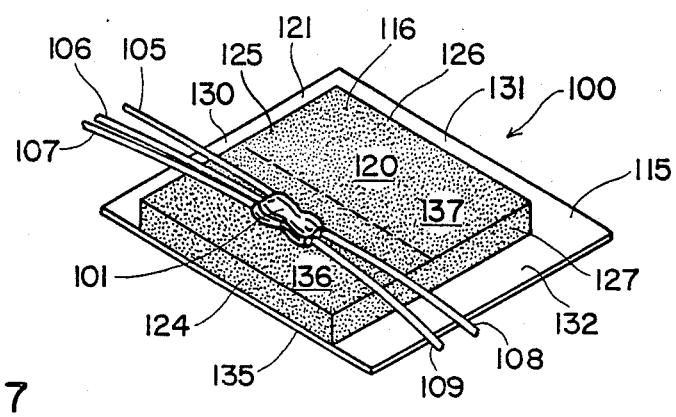
FIG. 6 is a fragmentary schematic perspective view of an electrical junction positioned on a sealant pad arrangement according to an alternate embodiment of the present invention.

A particularly advantageous embodiment of the present invention is illustrated in FIGS. 6 through 10. This arrangement generally alleviates the above described problems. Referring to FIG. 6, arrangement 100 is illustrated having electrical junction 101 placed thereon. Generally, electrical junction 101 may be one of any of a variety of types, as previously described. The junction 101 depicted comprises a junction formed at a location wherein five wires 105, 106, 107, 108 and 109 are brought together.

The arrangement 100 comprises substrate 115 having pad 116 of sealant 120, thereon.

For the embodiment of FIG. 6, the substrate 115 is sized, relative to the pad 116, so as to provide a flap 121 of substrate 115 extending beyond and framing the pad 116 along three of the four sides of the pad 116. More specifically, pad 116 is rectangularly shaped and has edges 124, 125, 126 and 127. These are divided into opposite end edges 125 and 127, between which wires 105, 106, 107, 108 and 109 generally extend, as shown in FIG. 6., and opposite side edges 124 and 126.

The arrangement 100 shown in FIG. 6 is generally such that substrate 115 includes border or overlap portions 130, 131 and 132 oriented to extend generally along edges 125, 126 and 127 respectively. Each of portions 130, 131 and 132 preferably extends beyond pad 116 by at least by ⅛ to ⅜ inches (0.3–1.0 cm) and preferably about ¼ inch (0.6 cm).

Figure 7:
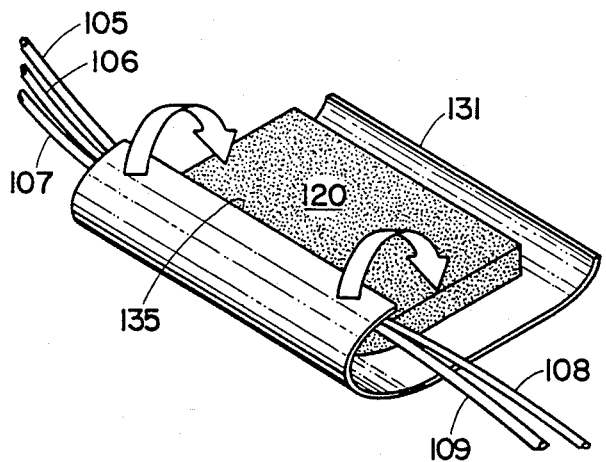
FIG. 7 is a fragmentary schematic perspective view of a step in a process of utilizing the alternative embodiment of FIG. 6.

Referring to FIGS. 6 and 7, generally for utilization of arrangement 100, and during a process of providing a seal around junction 101 according to the preferred embodiment, electrical connection 101 is not set in the middle of pad 116, as was done for the previously described embodiment. Referring to FIG. 6, pad 116 is asymmetrically positioned on substrate 115, so that edge 124 is substantially flush with substrate edge 135. In particular, the substrate may be viewed as having first and second halves or portions 136 and 137. During the process of the presently described embodiment, preferably junction 102 is positioned on portion 136, near or toward the edge 124 of pad 116 that does not include in association therewith an overlap portion such as portions 130, 131 and 132. During a preferred process of providing an environmental seal around a junction 101, arrangement 100 is rolled around the junction 101 and electrical connection 101, as shown in FIG. 7. In particular, the arrangement is rolled from edge 135 toward edge portion 131, such that flap 131 will overlap the overall arrangement 100, as illustrated in FIG. 8.

Figure 8:
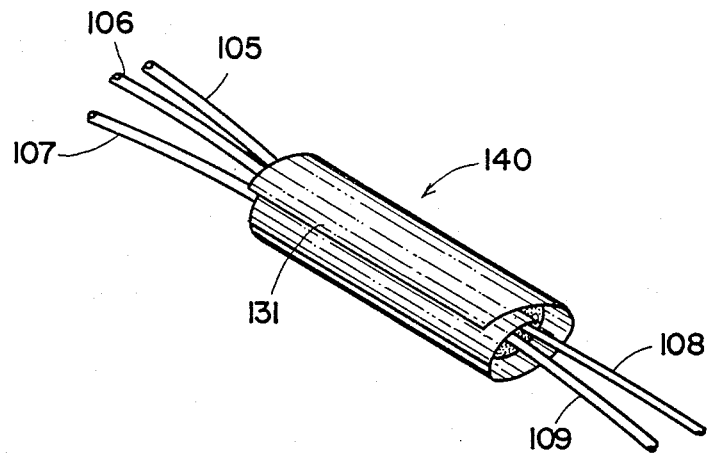
FIG. 8 is a fragmentary schematic perspective view of a step in a process of utilizing the embodiment of FIG. 6, and following the step of FIG. 7.

The arrangement 140 of FIG. 8 is generally analogous to the arrangement 50 of FIG. 2. That is, arrangement 140, depicted in FIG. 8, is a pre-pressure treated arrangement.

Figure 9:
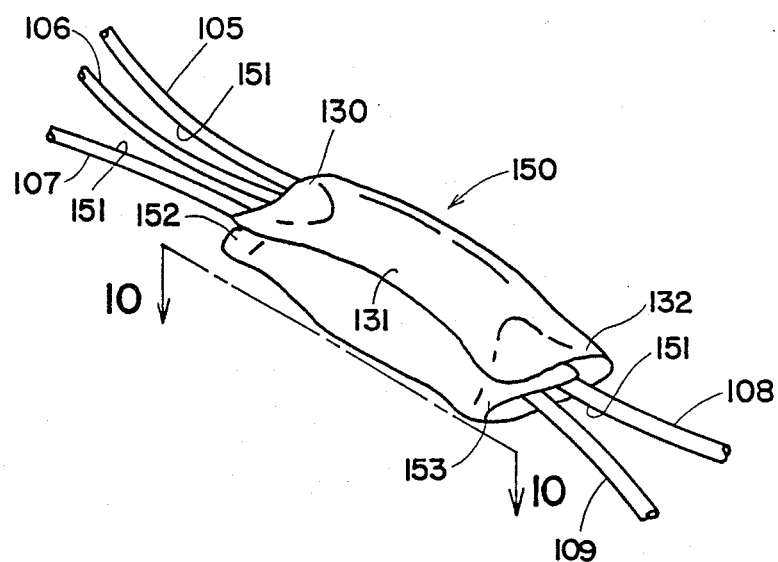
FIG. 9 is an enlarged fragmentary perspective view of a sealant/electrical junction arrangement according to the embodiment of FIGS. 6 through 8, after a step of compression.
Figure 10:
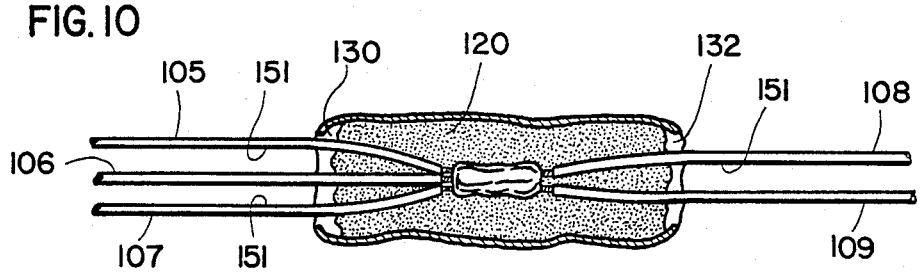
FIG. 10 is a fragmentary top cross-sectional view of the arrangement shown in FIG. 9; the cross-section being sufficient to show an electrical junction imbedded within sealant and being taken generally along line 10—10.

Generally, arrangement 140 is treated, according to the present invention, in a manner similar to arrangement 50 of FIG. 2, by compression between oppositely directed die plates to yield a final sealant/junction arrangement 150, FIG. 9, with sealant 120 effectively spreading wires 105, 106, 107, 108 and 109 apart, and with sealant 120 in areas 151 between the wires 105, 106, 107, 108 and 109. The extra flap portions 130 and 132 in the substrate 115, provide for good coverage of sealant 120, even should some of the sealant leak toward opposite ends 152 and 153 in arrangement 150 during compression. The rolling illustrated by FIG. 7, with the offset pad 116 of sealant 120, generally minimizes excess sealant 120 along any particular side of junction 102. Flap 131 generally covers and contains sealant 120, providing relatively little, if any, exposed sealant 120. Referring to FIG. 10, fluid forces, as previously described, during compression yield good sealant flow into spaces 151 between wires 105, 106, 107, 108 and 109 for effective sealing. This is enhanced, of course, by utilization of die plate designs as previously described, with recesses therein; the recesses having opposite side walls and end surfaces. It will be understood that the preferred step of compression for this embodiment involves use of analogously shaped die plates, and alignment of the arrangement 140 relative to the die plates, in a similar manner to the embodiment of FIGS. 1–5. To accommodate the wide flap areas of arrangement 140, near ends 152 and 153, it may be preferred to provide relatively wide end surfaces, analogous to surfaces 66 and 67, in the die plates.

Other Applications

Figure 11:
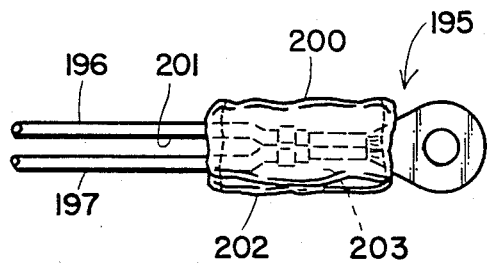
FIG. 11 is a top plan view of an embodiment of the present invention including a terminal connector; phantom lines indicating portions out of view.
Figure 12:
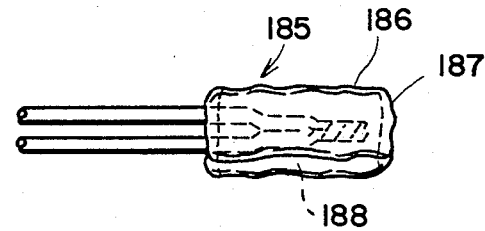
FIG. 12 is a top plan view of an embodiment of the present invention involving a pig-tail connection; phantom lines indicating portions out of view.

In FIGS. 11 and 12 alternate applications of the present invention are illustrated. In particular, in FIG. 12 a pigtail-type electrical connection 185 is depicted, enclosed by a sealant arrangement 186 according to the present invention. Generally, FIG. 12 is meant to indicate that it is not necessary for the Wires to extend out of opposite ends of the sealant arrangement 186, but rather all wires could extend out of a single end, and advantages could still be obtained through utilization of pressure and hydraulic forces on a sealant, according to the method of the present invention, to cause wire spreading and sealing in areas therebetween. It will be understood that generally the sealant arrangement 186 of FIG. 11 comprises a substrate 187 having therein a pad of sealant material 188.

From reference to FIG. 11 it will be understood that in some embodiments of the present invention junctions or connections between wire and non-wire components, such as ring-like connectors, may also be protected using sealing arrangements according to the present invention. Specifically in FIG. 12, a ring-like terminal or connector 195 is depicted having a pair of parallel wires 196 and 197 mounted in engagement therewith. Seal arrangement 200 is depicted around the joint of connection between the wires 196 and 197, and the ring 195. Area 201 between the wires 196 and 197 is effectively protected by the seal arrangement 200, since the seal arrangement 200 comprises a substrate 202 having a sealant pad 203 therein, applied and compressed according to the principles of the invention.

It is to be understood that while certain embodiments of the present invention have been illustrated as described, the invention is not to be limited to the specific forms or arrangement of parts herein described and shown. Further, methods of present invention are not to be understood as limited by the above descriptions, except as defined by the following claims.

What is claimed and desired to be secured by Letters as Patent:

1. A method of providing an environmental seal about an electrical junction, wherein the junction includes at least a pair of wires extending thereto in a manner generally adjacent one another; said method including the
   (a) encasing the electrical junction within a pad of viscous sealant having a flexible substrate wrapped therearound; a resulting encased electrical junction having the wires projecting outwardly therefrom; and,
   (b) applying sufficient pressure externally to the substrate-wrapped sealant pad to generate hydraulic forces therein sufficient to cause spreading of the adjacent wires and to force sealant between the adjacent wires.

2. A method of providing an environmental seal about an electrical junction, wherein the junction includes at least a pair of adjacent wires extending thereto in a manner generally adjacent one another; said method including the steps of:
   (a) providing a sealant pad arrangement comprising a flexible substrate having a pad of viscous sealant thereon; and,
   (b) wrapping said sealant pad arrangement about the electrical junction, with said junction engulfed within said sealant and with the adjacent wires extending outwardly therefrom to form a substrate-wrapped sealant/electrical junction combination; and,
   (c) applying sufficient pressure externally to the substrate-wrapped sealant/electrical junction combination to generate hydraulic forces therein sufficient to cause spreading of the adjacent wires and to force sealant between the adjacent wires.

3. A method according to claim 2 wherein:
   (a) each of said die plates is provided with a recess therein having sealant flow directing means constructed and arranged to direct flow of sealant in a manner generally normal to the adjacent wires, to spread same.

4. A method according to claim 2 wherein:
   (a) each of said die plates includes a concave recess defining a pair of flat end surfaces and a pair of side walls; said die plates being oriented generally as mirror images of one another during said step of compressing; and,
   (b) said method includes a step of orienting said substrate-wrapped sealant/electrical junction combination, prior to said step of compressing, with adjacent wires extending outwardly therefrom directed generally across said die plate recess end surfaces, and between said recess side walls.

5. A method according to claim 4 wherein:
   (a) said sealant comprises a moisture-resistant sealant having a viscosity of at least 2000 poise, at a shear rate of 1/600 sec., at 75° C.; and,
   (b) said step as compressing includes applying a force of at least about 200 lbs/in$^2$ to said sealant/electrical junction combination.

6. A method according to claim 5 wherein said force is less than about 900 lbs./in$^2$.

7. A method according to claim 3 wherein said substrate comprises a sheet of flexible, non-tacky, all-weather vinyl material.

8. A method of providing an environmental seal about an electrical junction, wherein the junction includes at least a pair of wires extending thereto in a manner generally adjacent one another; said method including the steps of:
   (a) providing a sealant pad arrangement comprising substantially flat, flexible substrate with a viscous sealant pad thereon;
      (i) said flexible substrate having first and second opposite side edges, and first and second opposite end edges;
      (ii) said sealant pad comprising a continuous pad of sealant adhered to said substrate; said pad being size to extend substantially adjacent to said substrate end edges;
      (iii) said sealant pad having opposite side edges; and said substrate including edge flap portions extending beyond each of said sealant pad side edges;
   (b) placing a junction to be sealed on an approximate center of said pad of sealant, with the adjacent wires extending generally outwardly past at least one of said substrate end edges;
   (c) folding said sealant pad arrangement about the junction in a manner generally engulfing the junction in said sealant and mating said sealant bed side edges to one another, with said substrate edge flaps oriented to selectively cover said sealant pad side edges; said folding generating a substrate-wrapped sealant/electrical junction combination; and,
   (d) applying sufficient pressure externally to the substrate-wrapped sealant/electrical junction combination to generate hydraulic forces therein sufficient to cause spreading of the adjacent wires and to force sealant between the adjacent wires.

9. A method according to claim 8 wherein:
   (a) said step of applying pressure to said substrate-wrapped sealant/electrical junction combination comprises compressing said combination between a pair of die plates.

10. A method according to claim 8 wherein:
    (a) each of said die plates is provided with a recess therein having sealant flow directing means constructed and arranged to direct flow of sealant in a manner generally normal to the adjacent wires, to spread same.

11. A method according to claim 9 wherein:

(a) each of said die plates includes a concave recess defining a pair of opposite surfaces and a pair of opposite side walls; said die plates being oriented generally as mirror images of one another during said step of compressing; and,
(b) said method includes a step of orienting said substrate-wrapped sealant/electrical junction combination, prior to said step of compressing, with adjacent wires extending outwardly therefrom directed generally between and parallel to said die plate recess side walls and across said end surfaces; and, said step of orienting includes positioning said substrate-wrapped combination with the mated sealant pad side edges directed toward one of said die plates.

12. A method according to claim 11 wherein:
(a) said sealant comprises a moisture-resistant sealant having a viscosity of at least 2000 poise, at a shear rate of 1/600 sec., at 75° C.; and,
(b) said step as compressing includes applying a force of at least about 200 lbs/in$^2$ to said sealant/electrical junction combination.

13. A method according to claim 12 wherein said force is less than about 900 lbs/in$^2$.

14. A method according to claim 7 wherein said substrate is a sheet of flexible, non-tacky, all weather vinyl having a thickness of about 0.01–0.02 cm.

15. A method of providing an environmental seal about an electrical junction, wherein the junction includes at least a pair of adjacent wires extending thereto in a manner generally adjacent one another; said method including the steps of:
(a) providing a sealant pad arrangement comprising a substantially flat, flexible substrate with a bed of viscous sealant thereon;
  (i) said flexible substrate having first and second opposite side edges, and first and second opposite end edges;
  (ii) said bed of sealant comprising a continuous pad of sealant adhered to said substrate; said pad being oriented and sized to extend substantially adjacent said substrate first side edge, and, said flexible substrate including edge flap portions extending beyond said sealant pad adjacent said substrate second side edge and said first and second substrate end edges;
  (iii) said bed of sealant having a first and second haves, said bed first half being positioned substantially adjacent said substrate first side edge;
(b) placing a junction to be sealed on said sealant bed first half, with the adjacent wires extending generally parallel to the substrate side edges;
(c) rolling said sealant pad arrangement about the junction in a manner generally engulfing the junction in said sealant by rolling said substrate first side edge toward said substrate second side edge; said rolling generating a substrate-wrapped sealant/electrical junction combination; and,
(d) applying sufficient pressure externally to the substrate-wrapped sealant/electrical junction combination to generate hydraulic forces therein sufficient to cause spreading of the adjacent wires and to force sealant between the adjacent wires.

16. A method according to claim 15 wherein:
(a) each of said die plates is provided with a recess therein having sealant flow directing means constructed and arranged to direct flow of sealant in a manner generally normal to the adjacent wires, to spread same.

17. A method according to claim 15 wherein:
(a) each of said die plates includes a concave recess defining a pair of opposite side walls and opposite end surfaces; said die plates being oriented generally as mirror images of one another during said step of compressing; and,
(b) said method includes a step of orienting said substrate-wrapped sealant/electrical junction combination with adjacent wires extending outwardly therefrom directed generally between said die plate recess side walls and across said end surfaces.

18. A method according to claim 17 wherein:
(a) said sealant comprises a moisture-resistant sealant having a viscosity of at least 2000 poise, at a shear rate of 1/600 sec., at 75° C.; and,
(b) said step as compressing includes applying a force of at least about 200 lbs/in$^2$ to said sealant/electrical junction combination.

19. A method according to claim 18 wherein said force is less than about 900 lbs/in$^2$.

20. A method according to claim 15 wherein said substrate comprises a sheet of flexible, non-tacky, all-weather vinyl plastic having a thickness of 0.01–0.02 cm.

21. A sealant pad arrangement for use in providing an environment seal around a connection; said sealant pad arrangement comprising:
(a) a substantially flat flexible substrate having first and second opposite end edges, and first and second opposite side edges; and,
(b) a bed of viscous sealant adhered to said flexible substrate; said bed of viscous sealant being sized to be molded around and engulf a junction to be sealed; said bed of sealant comprising a substantially continuous pad of sealant positioned on said substrate to extend substantially adjacent said substrate first end edge, and to be overlapped by said substrate side edges and said substrate second end edge by an amount at least equal to about a maximum thickness of said sealant pad.

22. An arrangement according to claim 21
(a) said substrate comprises a sheet of non-tacky, all-weather vinyl plastic material.

23. An arrangement according to claim 22 wherein:
(a) said substrate has a thickness of 0.01–0.02 cm.

24. An arrangement according to claim 21 wherein said sealant comprises a soft, tackified, elastomeric composition having a viscosity of at least 2000 poise, at a shear rate of 1/600 sec., and at 75° C.

25. A method of providing an environmental seal about an electrical junction, wherein the junction includes at least a pair of adjacent wires extending thereto in a manner generally adjacent one another; said method including the steps of:
(a) providing a sealant pad arrangement comprising a flexible substrate having a pad of viscous sealant thereon;
(b) wrapping said sealant pad arrangement about the electrical junction, with said junction engulfed within said sealant and with the adjacent wires extending outwardly therefrom to form a substrate-wrapped sealant/electrical junction combination; and,
(c) applying sufficient pressure externally to the substrate-wrapped sealant/electrical junction combination to generate hydraulic forces therein sufficient to cause spreading of the adjacent wires and to force sealant between the adjacent wires; said step of applying pressure to said substrate-wrapped sealant/electrical junction combination comprising compressing said combination between a pair of die plates.

26. A method according to claim 25 wherein:
(a) each of said die plates includes a recess; said die plates being oriented as mirror images of one another at least during said step of compressing; and,
(b) said method includes a step of orienting said substrate-wrapped sealant/electrical junction combination, during said step of compressing, at least partially received within said die plate recesses.

27. A method of providing an environmental seal about an electrical junction, wherein the junction includes at least a pair of wires extending thereto in a manner generally adjacent one another; said method including the steps of:
(a) providing a sealant pad arrangement comprising flexible substrate with a viscous sealant pad thereon;
  (i) said flexible substrate having first and second opposite side edges, and first and second opposite end edges;
  (ii) said sealant pad comprising a continuous pad of sealant adhered to said substrate; said pad being sized to extend substantially adjacent to said substrate end edges;
  (iii) said sealant pad having opposite side edges; and said substrate including edge flap portions extending beyond each of said sealant pad side edges;
(b) placing a junction to be sealed on approximate center of said pad of sealant, with the adjacent wires extending generally outwardly past at least one of said substrate end edges;
(c) folding said sealant pad arrangement about the junction in a manner generally engulfing the junction in said sealant and mating said sealant bed side edges to one another, with said substrate edge flaps oriented to selectively cover said sealant pad side edges; said folding generating a substrate-wrapped sealant/electrical junction combination; and,
(d) applying sufficient pressure externally to the substrate-wrapped sealant/electrical junction combination to generate hydraulic forcers therein sufficient to cause spreading of the adjacent wires and to force sealant between the adjacent wires; said step of applying pressure to said substrate-wrapped sealant/electrical junction combination comprises compressing said combination between a pair of die plates.

28. A method according to claim 27 wherein:
(a) each of said die plates includes a recess; said die plates being oriented as mirror images of one another at least during said step of compressing; and,
(b) said method includes a step of orienting said substrate-wrapped sealant/electrical junction combination, during said step of compressing, at least partially received within said die plate recesses.

29. A method of providing an environmental seal about an electrical junction, wherein the junction includes at least a pair of adjacent wires extending thereto in a manner generally adjacent one another; said method including the steps of:
(a) providing a sealant pad arrangement comprising a flexible substrate with a bed of viscous sealant thereon;
  (i) said flexible substrate having first and second opposite side edges, and first and second opposite end edges;
  (ii) said bed of sealant comprising a continuous pad of sealant adhered to said substrate; said pad being oriented and sized to extend substantially adjacent said substrate first side edge, and, said flexible substrate including edge flap portions extending beyond said sealant pad adjacent said substrate second side edge and said first and second substrate end edges;
  (iii) said bed of sealant having a first and second halves, said bed first half being positioned substantially adjacent said substrate first side edge;
(b) placing a junction to be sealed on said sealant bed first half, with the adjacent wires extending generally parallel to the substrate side edges; and,
(c) rolling said sealant pad arrangement about the junction in a manner generally engulfing the junction in said sealant by rolling said substrate first side edge toward said substrate second side edge; said rolling generating a substrate-wrapped sealant/electrical junction combination; and,
(d) applying sufficient pressure externally to the substrate-wrapped sealant/electrical junction combination to generate hydraulic forces therein sufficient to cause spreading of the adjacent wires and to force sealant between the adjacent wires; said step of applying pressure to said substrate-wrapped sealant/electrical junction combination comprises compressing said combination between a pair of die plates.

30. A method according to claim 27 wherein:
(a) each of said die plates includes a recess; said die plates being oriented as mirror images of one another at least during said step of compressing; and,
(b) said method includes a step of orienting said substrate-wrapped sealant/electrical junction combination, during said step of compressing, at least partially received within said die plate recess.

* * * * *